United States
Yabe et al.

[11] 3,877,796
[45] Apr. 15, 1975

[54] REAR CONVERTER LENS

[75] Inventors: Shinji Yabe; Kaoru Seiyama, both of Tokyo, Japan

[73] Assignee: Yabe Optical Inst. Mfg. Co., Ltd., Tokyo, Japan

[22] Filed: Oct. 25, 1973

[21] Appl. No.: 409,745

[30] Foreign Application Priority Data
May 1, 1973 Japan.............................. 48-49252

[52] U.S. Cl.................................. 350/215; 350/176
[51] Int. Cl. ............................................. G02b 9/62
[58] Field of Search ............ 350/214, 215, 176, 183

[56] References Cited
FOREIGN PATENTS OR APPLICATIONS
18,121   1907   United Kingdom................. 350/183

Primary Examiner—John K. Corbin
Attorney, Agent, or Firm—Robert E. Burns; Emmanuel J. Lobato; Bruce L. Adams

[57] ABSTRACT

Rear converter lens to be attached behind a master lens. The rear converter lens consists of six groups of lens component, wherein the first lens component is of negative refractive power; the second lens component, positive refractive power; the third lens component, negative refractive power; the fourth lens component, positive refractive power; the fifth lens component, negative refractive power; and the six lens component, positive refractive power.

2 Claims, 10 Drawing Figures

REAR CONVERTER LENS

BACKGROUND OF THE INVENTION

This invention relates to a converter lens to be attached to a master lens, and more particularly to a rear converter lens to be attached behind a master lens.

We have previously contrived a practical lens type of rear converter lens which is attached behind the master lens to make the total focal length long at a definite ratio to let it function as a telephoto-lens.

This type of rear converter lens, however, has a large remaining amount of aberrations and its performance is inferior to that of a simple interchangeable telephoto-lens. For instance, a resolving power of photographing at the time of open stop is unsatisfactory, and when the focus is taken in a single-lens reflex camera, it is not easy to focus; further when photographed with the lens stopped down, the contrast of the image is inadequate, and when the image is subjected to magnifying printing on a photo-printing paper, it becomes blurred and a clear enlargement can not be obtained.

In such cases, correction of aberration is very difficult in lens designing, particularly the method for correction of aberration of a rear converter lens having negative focal length, which functions as a telephoto lens, can not be easily achieved, in contrast to the correction of aberration of usual interchangeable telephoto lenses having positive focal length.

SUMMARY OF THE INVENTION

It is a purpose of the present invention to provide a rear converter lens, about which aberration may be easily corrected in lens designing.

Another object of the present invention is to provide a rear converter lens, whose status of correcting aberrations is favorably arranged, and whose performace is practically as high as that of a simple interchangeable telephoto lens having equal focal length, and it possesses high resolving power.

According to the present invention, a rear converter lens is provided, which comprises six groups of lens components, wherein the first lens component at the side of the master lens has a slightly convex surface towards the side of the master lens and being of negative refractive power, the second lens component being of positive refractive power, and the third lens component has a slightly convex surface towards the side of the second lens component and being of negative refractive power, the fourth lens component and the fifth lens component confront each other with sharp concavities at a distance of axial airspace and respectively being of positive refractive power and negative refractive power, and the sixth lens component being of positive refractive power.

The other objects, features and advantages of the invention will be apparent from the following more detailed description of preferred embodiments of the invention, as illustrated in the accompanying drawings.

BRIEF DESCRIPTION OF THE DRAWINGS

FIG. 2 to FIG. 5 inclusive are aberration curves of the rear converter lens shown in FIG. 1, wherein FIG. 2 shows spherical aberration; FIG. 3, sine condition; FIG. 4, astigmatism; and FIG. 5, distortion respectively.

FIG. 7 to FIG. 10 inclusive are aberration curves of the rear converter lens shown in FIG. 6, wherein FIG. 7 shows spherical aberration; FIG. 8, sine condition; FIG. 9, astigmatism; and FIG. 10, distortion respectively.

DESCRIPTION OF THE PREFERRED EMBODIMENTS

Figure 1:
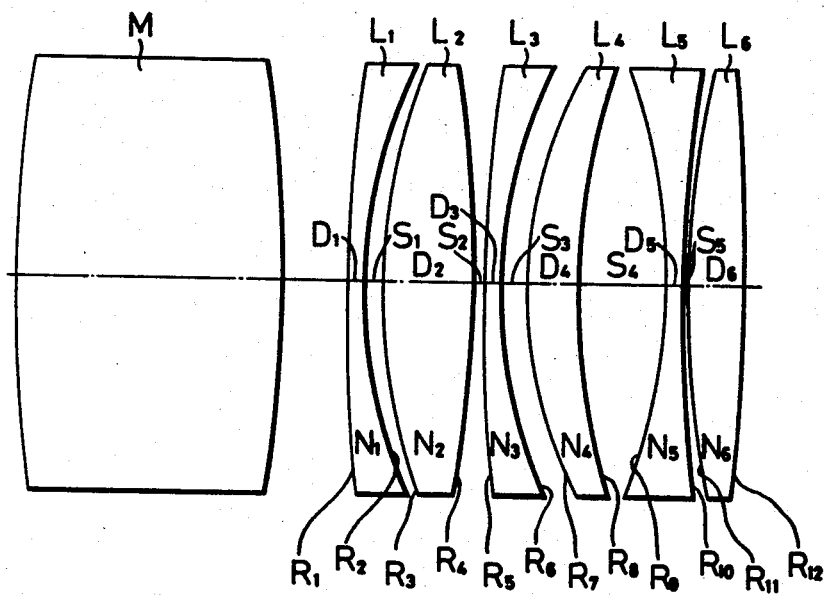
FIG. 1 is a diagrammatic axial section of a rear converter lens according to the present invention.

Referring to FIG. 1, as a master lens M, any type of photographic lens, for instance, Tessar type, Sonnar type, Gauss type or the like is used. In the drawings, details of composition of the master lens are not shown.

The first lens component $L_1$ of the rear converter lens having curvatures defined by radii $R_1$, $R_2$ is composed of a meniscus lens having a slightly convex surface towards the side of the object, i.e., the side of the master lens M and being of negative refractive power. The second lens component $L_2$ having curvatures defined by radii $R_3$, $R_4$ is composed of a biconvex lens and being of positive refractive power, and the third lens component $L_3$ having curvatures defined by radii $R_5$, $R_6$ is composed of a meniscus lens having a slightly convex surface towards the side of the second lens component. The fourth lens component $L_4$ and the fifth lens component $L_5$ having curvatures defined respectively by $R_7$, $R_8$ and $R_9$, $R_{10}$ are composed respectively of a meniscus lens being of positive refractive power and a biconcave lens being of negative refractive power, which are confronting each other with a considerable distance of axial between facing concave surfaces, and the sixth lens component $L_6$ having curvatures defined by radii $R_{11}$, $R_{12}$ is composed of a biconvex lens being of positive refractive power.

These lens components satisfy the following formulas or conditions, in which $F_1$, $F_2$, $F_3$, $F_4$, $F_5$ and $F_6$ represent respectively the focal length of each lens from the side of the object; $F$, the total focal length of the lens group; $F_{1,2,3,4}$, the total focal length from the first to the fourth lens; and $F_{5,6}$, the total focal length of the fifth and the sixth lens components. And, D, S, N and V respectively represent the axial thickness, axial space, refractive index and Abbe number of the associated lens components, which are numbered by subscript from front to rear. L represents the total axial length of the axial thickness added to the axial space of each lens component.

$$|F_1| + |F_3| \leq |F_2| + |F_4| \quad \ldots (1)$$

$$|F_{1\cdot2\cdot3\cdot4}| \geq 2.5 |F| \quad \ldots (2)$$

$$|F_5| \leq |F_6| \quad \ldots (3)$$

$$F_{5\cdot6} \leq 1.7F \quad \ldots (4)$$

$$|F_{1\cdot2\cdot3\cdot4}| \geq |1.5 (F_{5\cdot6})| \quad \ldots (5)$$

$$L \leq F/1.8 \quad \ldots (6)$$

$$S_4 \leq F/\text{number of lens in the whole system} \quad \ldots (7)$$

-Continued $$|R_1| > |F| > |R_2| \quad \ldots (8)$$

$$|R_3| < |F| < |R_4| \quad \ldots (9)$$

$$|R_5| > |F| > |R_6| \quad \ldots (10)$$

$$F > R_9 > F/N_5 \quad \ldots (11)$$

$$N_1 \geqq (N_1 + N_2)/2 \quad \ldots (12)$$

$$N_3 \geqq (N_3 + N_4)/2 \quad \ldots (13)$$

$$N_5 \geqq (N_5 + N_6)/2 \quad \ldots (14)$$

In general, a rear converter lens is used for a single-lens reflex camera, in which however the reflex mirror moves, so that a suitable back focus is required to prevent the lens from contacting the reflex mirror. Therefore, it is necessary that the total length of the lens group be made short and, in this invention, a necessary back focus is obtained by satisfying the above conditions (6) and (7).

And, to arrange the status of aberrations favorably within these conditions, divergent lenses satisfying the above conditions (8), (10) are applied to the first and the third lens components, and to decrease the amount of spherical aberration and of aberration of coma, meniscus lenses are used, and on the other hand, a convergent biconvex lens of the second lens component satisfying the above condition (9) and a convergent meniscus lens of the fourth lens component are used.

The total focal length of these first and second lens components are of positive refractive power satisfying the above condition (12) and total focal length of these third and fourth lens components are of negative refractive power satisfying the above condition (13).

The total focal length from the first to the fourth lens components inclusive is made to be of slightly negative or slightly positive refractive power satisfying the above conditions (1) and (2). These conditions have a function to arrange favorably the status of aberrations, to assure necessary lens back focus, to decrease the width of spherical aberration, to keep the coma of open stop small and to intensify the contrast of focusing image.

By applying a divergent biconcave lens, which satisfies the above conditions (11) and (14), to the fifth lens component, the total focal length of the whole system as it aims is made to have negative refractive power, while applying positive refractive power to the sixth lens component to satisfy the above conditions (3) and (4), and satisfying the balance of aberrations of the whole system by condition (5), the curvature of field may be favorably arranged.

EXAMPLE 1:

In a lens composition shown in FIG. 1, an embodiment in case F = −100 mm is shown as follows.

| lens component | radius of curvature (mm) | N | V | D or S (mm) |
|---|---|---|---|---|
| $L_1$ | $R_1 =$ 260.141 | 1.88300 | 40.9 | $D_1 =$ 2.33 |
|  | $R_2 =$ 66.018 |  |  | $S_1 =$ 2.18 |
| $L_2$ | $R_3 =$ 77.369 | 1.68893 | 31.1 | $D_2 =$ 11.76 |
|  | $R_4 =$ −172.156 |  |  | $S_2 =$ 1.63 |
| $L_3$ | $R_5 =$ 272.950 | 1.81600 | 46.8 | $D_3 =$ 2.21 |
|  | $R_6 =$ 73.601 |  |  | $S_3 =$ 3.26 |
| $L_4$ | $R_7 =$ 57.330 | 1.60565 | 37.9 | $D_4 =$ 6.58 |
|  | $R_8 =$ 92.449 |  |  | $S_4 =$ 11.11 |
| $L_5$ | $R_9 =$ −75.546 | 1.88300 | 40.9 | $D_5 =$ 2.10 |
|  | $R_{10}=$ 205.665 |  |  | $S_5 =$ 0.47 |
| $L_6$ | $R_{11}=$ 134.407 | 1.60565 | 37.9 | $D_6 =$ 7.18 |
|  | $R_{12}=$ −299.207 |  |  |  |

Figure 2:
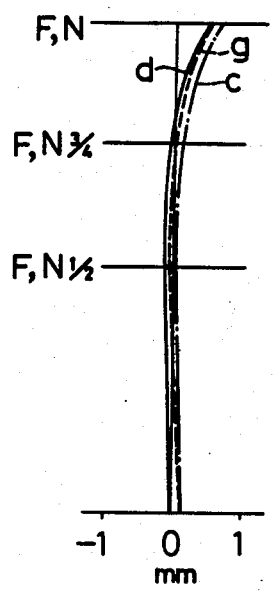
Figure 3:
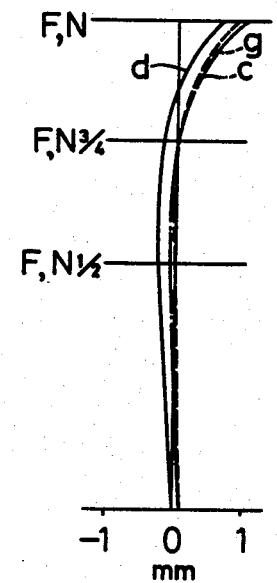
Figure 4:
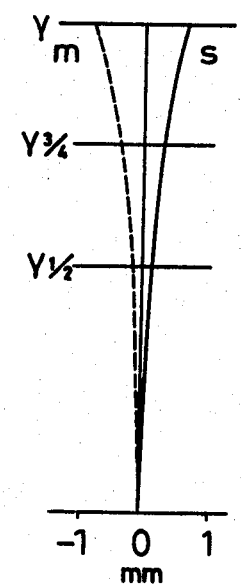
Figure 5:
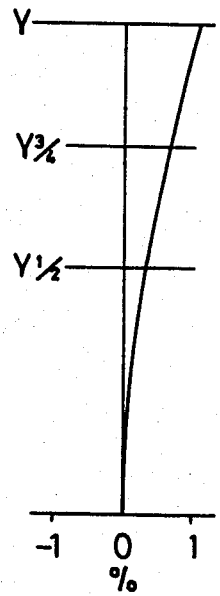

Aberration curves of this embodiment are shown in FIG. 2 to FIG. 5 inclusive, wherein FIG. 2 denotes spherical aberration; FIG. 3, sine condition; FIG. 4, astigmatism; and FIG. 5, distortion respectively.

In the aberration curves, F, N is incident height of light rays corresponding to F number, $d$ is $d$ line of the spectrum of helium, $g$ is $g$ line of the spectrum of mercury, $c$ is $c$ line of the spectrum of hydrogen, Y is height of focusing image, $m$ is meridional image surface, and $s$ is sagittal image surface respectively.

Figure 6:
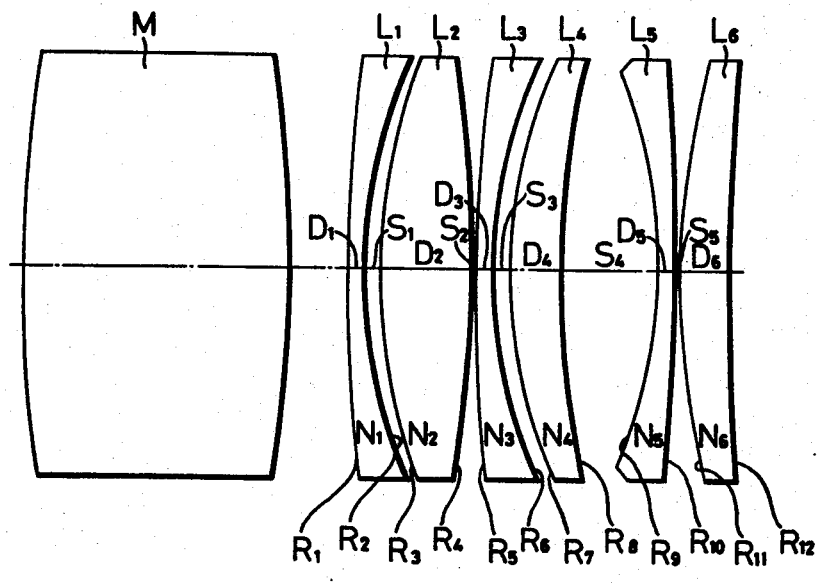
FIG. 6 is a diagrammatic axial section of another embodiment of a rear converter lens according to the present invention.

EXAMPLE 2:

In FIG. 6, a lens composition of the second embodiment is shown. As is clear from the drawing, the first, the second, the third and the fourth lens components have practically the same composition as those of Example 1. The fifth lens component $L_5$ is composed by a meniscus lens having curvatures defined by radii $R_9$, $R_{10}$ and being of negative refractive power, and the sixth lens component $L_6$ is composed by a meniscus lens having curvatures defined by radii $R_{11}$, $R_{12}$ and being of positive refractive power. In this example, F = −100 mm.

| lens group | radius of curvature (mm) | N | V | D or S (mm) |
|---|---|---|---|---|
| $L_1$ | $R_1 =$ 233.178 | 1.81600 | 46.8 | $D_1 =$ 2.07 |
|  | $R_2 =$ 57.055 |  |  | $S_1 =$ 2.02 |
| $L_2$ | $R_3 =$ 69.635 | 1.68893 | 31.1 | $D_2 =$ 10.36 |
|  | $R_4 =$ −153.700 |  |  | $S_2 =$ 0.40 |
| $L_3$ | $R_5 =$ 233.178 | 1.81600 | 46.8 | $D_3 =$ 2.07 |
|  | $R_6 =$ 57.055 |  |  | $S_3 =$ 2.02 |
| $L_4$ | $R_7 =$ 59.975 | 1.60311 | 60.7 | $D_4 =$ 6.06 |
|  | $R_8 =$ 98.246 |  |  | $S_4 =$ 11.87 |
| $L_5$ | $R_9 =$ −64.405 | 1.88300 | 40.9 | $D_5 =$ 2.10 |
|  | $R_{10}=$ −333.935 |  |  | $S_5 =$ 0.40 |
| $L_6$ | $R_{11}=$ 95.306 | 1.61293 | 37.0 | $D_6 =$ 6.06 |
|  | $R_{12}=$ 275.089 |  |  |  |

Figure 7:
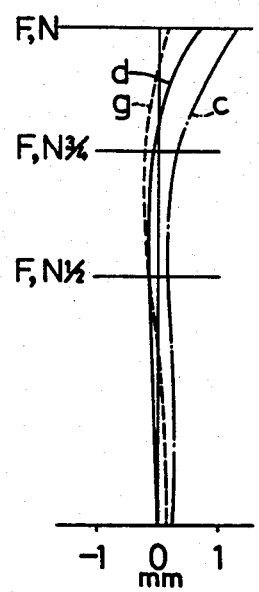
Figure 8:
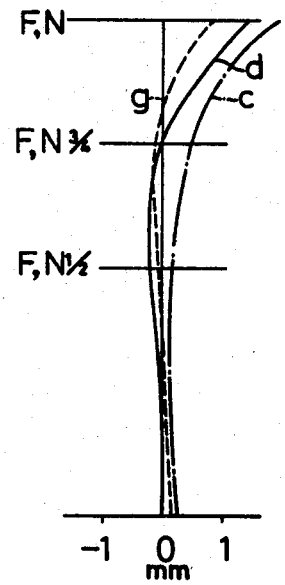
Figure 9:
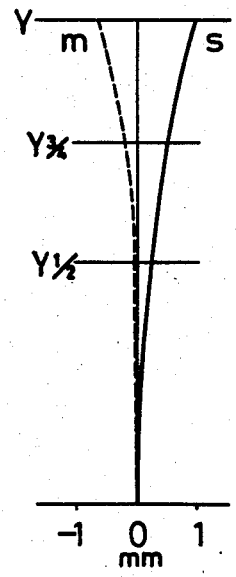
Figure 10:
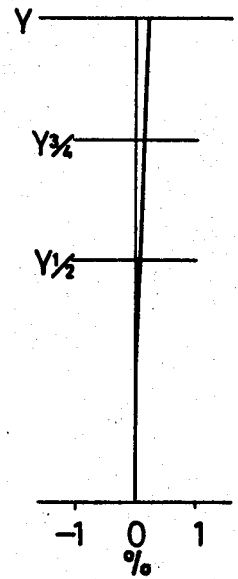

Aberration curves of this embodiment are shown in FIG. 7 to FIG. 10 inclusive, wherein FIG. 7 denotes spherical aberration; FIG. 8, sine condition; FIG. 9, astigmatism; and FIG. 10, distortion respectively.

While the invention has been particularly shown and described with reference to preferred embodiments thereof, it will be understood by those skilled in the art that various changes in form and details may be made therein without departing from the spirit and scope of the invention.

What is claimed is:

1. A rear converter lens, of which the total focal length of lens components of the whole system is of negative refractive power, characterized in that the rear converter lens consists of six groups of lens components, wherein the first lens component from a master lens has a slightly convex surface towards the side of the master lens and is of negative refractive power; the second lens component being of positive refractive power; the third lens component having a slightly convex surface towards the side of the second lens component and being of negative refractive power; the fourth and the fifth lens components being of positive refractive power and being of negative refractive power respectively, which are confronting each other with sharp concavities at a distance of axial air space; and the sixth lens component being of positive refractive power, and that when F represents the total focal length of the whole system;

$F_{1,2,3,4}$, the total focal length of lenses from the first to the fourth lens components inclusive;

$F_{5,6}$, the total focal length of lenses of the fifth and the sixth lens components;

L, the total axial length of the axial thickness added to the axial space of each lens component;

$F_1, F_2, \ldots$, the focal length of each lens component in order from the side of the object;

$R_1, R_2, \ldots$, the radius of curvature of refractive surfaces of each lens component in order from the side of the object;

$D_1, D_2, \ldots$, the axial thickness of each lens component in order from the side of the object;

$S_1, S_2, \ldots$, the axial space of each lens component in order from the side of the object;

$N_1, N_2, \ldots$, the refractive index of each lens component in order from the side of the object;

$V_1, V_2, \ldots$, the Abee number of each lens component in order from the side of the object;

following conditions will be satisfied:

$|F_1| + |F_3| \leq |F_2| + |F_4|$, $|F_{1 \cdot 2 \cdot 3 \cdot 4}| \geq 2.5 |F|$, $|F_5| \leq |F_6|$, $F_{5 \cdot 6} \leq 1.7 F$, $|F_{1 \cdot 2 \cdot 3 \cdot 4}| \geq |1.5 (F_{5 \cdot 6})|$, $L \leq F/1.8$, $S_4 \leq F/\text{number of lens in the whole system}$, $|R_1| > |F| > |R_2|$, $|R_3| < |F| < |R_4|$, $|R_5| > |F| > |R_6|$, $F > R_9 > F/N_5$, $N_1 \geq (N_1 + N_2)/2$, $N_3 \geq (N_3 + N_4)/2$, $N_5 \geq (N_5 + N_6)/2$, said lens further having the following values for F = −100 mm:

| lens component | radius of curvature (mm) | | N | V | D or S (mm) |
|---|---|---|---|---|---|
| $L_1$ | $R_1 =$ | 260.141 | 1.88300 | 40.9 | $D_1 =$ 2.33 |
|  | $R_2 =$ | 66.018 |  |  | $S_1 =$ 2.18 |
| $L_2$ | $R_3 =$ | 77.369 | 1.68893 | 31.1 | $D_2 =$ 11.76 |
|  | $R_4 =$ | −172.156 |  |  | $S_2 =$ 1.63 |
| $L_3$ | $R_5 =$ | 272.950 | 1.81600 | 46.8 | $D_3 =$ 2.21 |
|  | $R_6 =$ | 73.601 |  |  | $S_3 =$ 3.26 |
| $L_4$ | $R_7 =$ | 57.330 | 1.60565 | 37.9 | $D_4 =$ 6.58 |
|  | $R_8 =$ | 92.449 |  |  | $S_4 =$ 11.11 |
| $L_5$ | $R_9 =$ | −75.546 | 1.88300 | 40.9 | $D_5 =$ 2.10 |
|  | $R_{10} =$ | 205.665 |  |  | $S_5 =$ 0.47 |
| $L_6$ | $R_{11} =$ | 134.407 | 1.60565 | 37.9 | $D_6 =$ 7.18 |
|  | $R_{12} =$ | −299.207 |  |  |  |

2. A rear converter lens, of which the total focal length of lens components of the whole system is of negative refractive power, characterized in that the rear converter lens consists of six groups of lens components, wherein the first lens component from a master lens has a slightly convex surface towards the side of the master lens and is of negative refractive power; the second lens component being of positive refractive power; the third lens component having a slightly convex surface towards the side of the second lens component and being of negative refractive power; the fourth and the fifth lens components being of positive refractive power and being of negative refractive power respectively, which are confronting each other with sharp concavities at a distance of axial air space; and the sixth lens component being of positive refractive power, and that when F represents the total focal length of the whole system;

$F_{1,2,3,4}$, the total focal length of lenses from the first to the fourth lens components inclusive;

$F_{5,6}$, the total focal length of lenses of the fifth and the sixth lens components;

L, the total axial length of the axial thickness added to the axial space of each lens component;

$F_1, F_2, \ldots$, the focal length of each lens component in order from the side of the object;

$R_1, R_2, \ldots$, the radius of curvature of refractive surface of each lens component in order from the side of the object;

$D_1, D_2, \ldots$, the axial thickness of each lens component in order from the side of the object;

$S_1, S_2, \ldots$, the axial space of each lens component in order from the side of the object;

$N_1, N_2, \ldots$, the refractive index of each lens component in order from the side of the object;

$V_1, V_2, \ldots$, the Abbe number of each lens component in order from the side of the object; following conditions will be satisfied:

$|F_1| + |F_3| \leq |F_2| + |F_4|$, $|F_{1 \cdot 2 \cdot 3 \cdot 4}| \geq 2.5 |F|$, $|F_5| \leq |F_6|$, $F_{5 \cdot 6} \leq 1.7 F$, $|F_{1 \cdot 2 \cdot 3 \cdot 4}| \geq |1.5 (F_{5 \cdot 6})|$, $L \leq F/1.8$, $S_4 \leq$ F/number of lens in the whole system, $|R_1| > |F| > |R_2|$, $|R_3| < |F| < |R_4|$, $|R_5| > |F| > |R_6|$, $F > R_9 > F/N_5$, $N_1 \geq (N_1 + N_2)/2$, $N_3 \geq (N_3 + N_4)/2$, $N_5 \geq (N_5 + N_6)/2$, said lens further having the following values for F = −100 mm:

| lens component | radius of curvature (mm) | | N | V | D or S (mm) |
|---|---|---|---|---|---|
| $L_1$ | $R_1 =$ | 233.178 | 1.81600 | 46.8 | $D_1 =$ 2.07 |
|  | $R_2 =$ | 57.055 |  |  | $S_1 =$ 2.02 |
| $L_2$ | $R_3 =$ | 69.635 | 1.68893 | 31.1 | $D_2 =$ 10.36 |
|  | $R_4 =$ | −153.700 |  |  | $S_2 =$ 0.40 |
| $L_3$ | $R_5 =$ | 233.178 | 1.81600 | 46.8 | $D_3 =$ 2.07 |
|  | $R_6 =$ | 57.055 |  |  | $S_3 =$ 2.02 |
| $L_4$ | $R_7 =$ | 59.975 | 1.60311 | 60.7 | $D_4 =$ 6.06 |
|  | $R_8 =$ | 98.246 |  |  | $S_4 =$ 11.87 |
| $L_5$ | $R_9 =$ | −64.405 | 1.88300 | 40.9 | $D_5 =$ 2.10 |
|  | $R_{10} =$ | −333.935 |  |  | $S_5 =$ 0.40 |
| $L_6$ | $R_{11} =$ | 95.306 | 1.61293 | 37.0 | $D_6 =$ 6.06 |
|  | $R_{12} =$ | 275.89. |  |  |  |

* * * * *